United States Patent
Prescott

(10) Patent No.: US 10,167,213 B2
(45) Date of Patent: Jan. 1, 2019

(54) AERATION CONTROL VALVE SYSTEM WITH BYPASS GAS RELEASE PASSAGE FOR WATER TREATMENT SYSTEM AND METHODS FOR USING SAME

(71) Applicant: R.E. Prescott Co., Inc., Exeter, NH (US)

(72) Inventor: Russell E. Prescott, Kingston, NH (US)

(73) Assignee: R.E. Proscott Co, Inc., Exeter, NH (US)

( * ) Notice: Subject to any disclaimer, the term of this patent is extended or adjusted under 35 U.S.C. 154(b) by 5 days.

(21) Appl. No.: 15/349,142

(22) Filed: Nov. 11, 2016

(65) Prior Publication Data

US 2018/0135769 A1    May 17, 2018

(51) Int. Cl.
| | |
|---|---|
| C02F 1/00 | (2006.01) |
| C02F 1/74 | (2006.01) |
| C02F 1/78 | (2006.01) |

(52) U.S. Cl.
CPC ................ *C02F 1/74* (2013.01); *C02F 1/001* (2013.01); *C02F 2201/005* (2013.01); *C02F 2209/005* (2013.01)

(58) Field of Classification Search
CPC ...... C02F 1/001; C02F 1/74; C02F 2201/005; C02F 2209/005
See application file for complete search history.

(56) References Cited

U.S. PATENT DOCUMENTS

| | | |
|---|---|---|
| 3,151,064 A | 9/1964 | Lathrop |
| 5,096,596 A | 3/1992 | Hellenbrand et al. |
| 5,628,899 A | 5/1997 | Vaughan |
| 5,919,373 A | 7/1999 | Naaktgeboren |
| 6,402,944 B1 | 6/2002 | Vaughan |
| 7,300,569 B2 | 11/2007 | Petty |
| 7,488,424 B2 | 2/2009 | Gruett |
| 7,491,321 B1 | 2/2009 | Maas |
| 7,563,361 B2 | 7/2009 | Gruett |
| 7,638,063 B1 | 12/2009 | Maas et al. |
| 7,722,760 B2 | 5/2010 | Griesbach |
| 8,691,091 B2 | 4/2014 | Prescott |

*Primary Examiner* — Dirk R Bass
(74) *Attorney, Agent, or Firm* — Grossman, Tucker, Perreault & Pfleger, PLLC

(57) ABSTRACT

An aeration control valve system with a bypass gas release passage may be used with an aerated water treatment system to control aeration and flow of water and gas (e.g., air or ozone) in accordance with various operating cycles. The aeration control valve system causes gas to be pumped or drawn into the water treatment system during a gas charge or draw cycle to provide a gas charge for aerating the water to facilitate water treatment. The aeration control valve system releases the gas during a gas release cycle while allowing the water treatment system to remain "in service" to continue to treat the water. To allow gas release when water is flowing during service, the bypass gas release passage is located external to or within the aeration control valve system and bypasses a flow region of the water that flows during service.

17 Claims, 7 Drawing Sheets

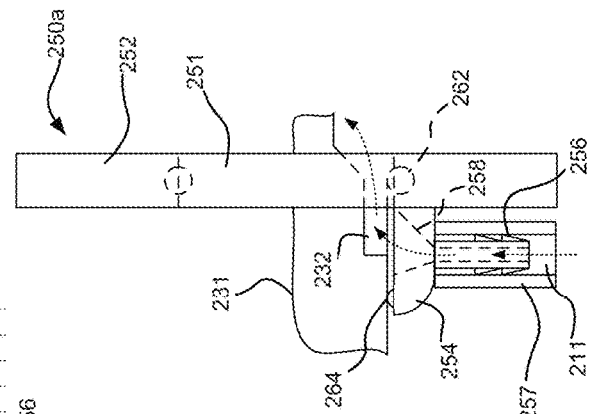
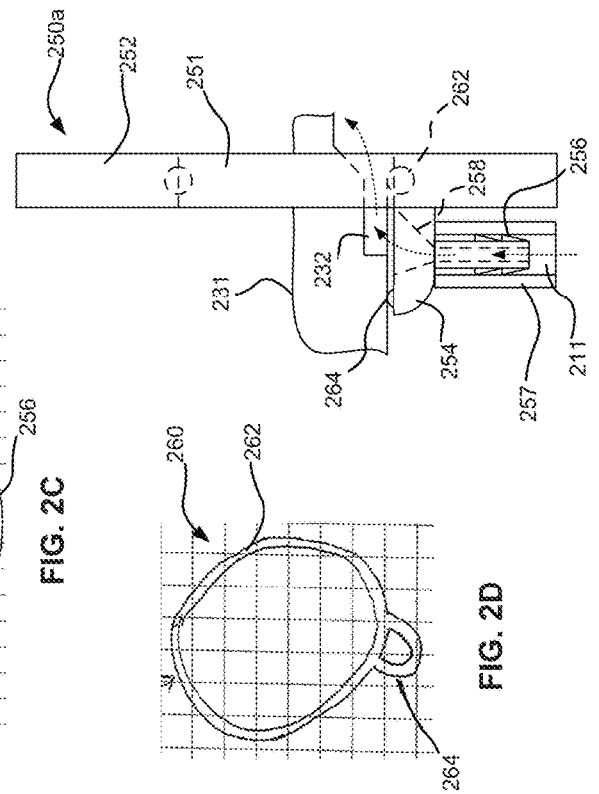
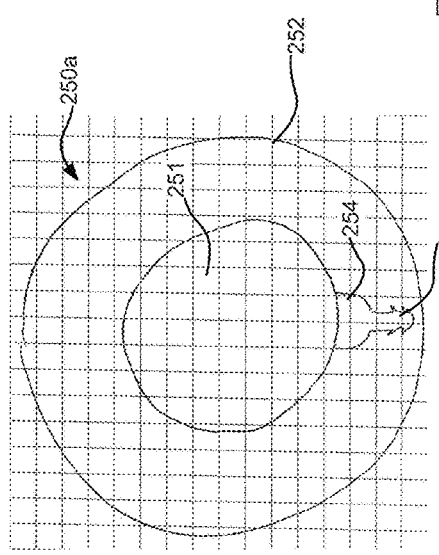
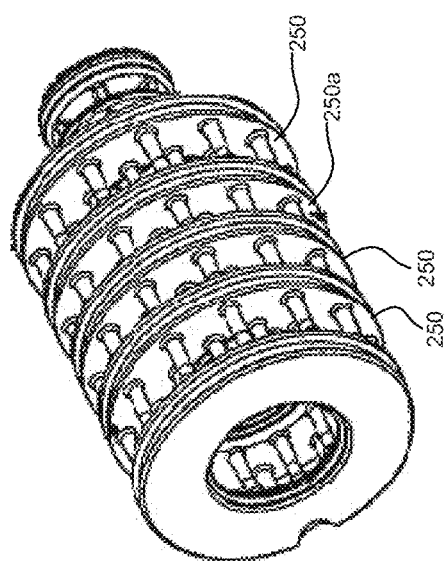
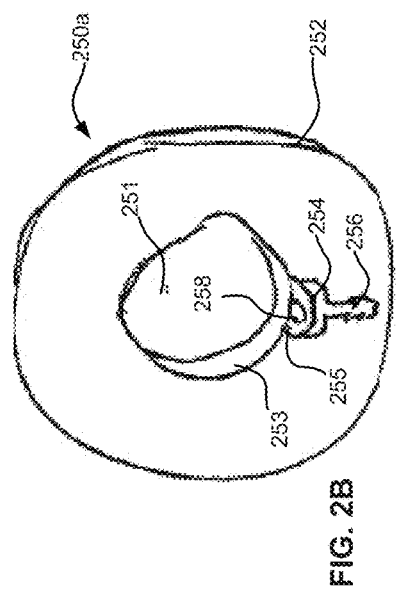

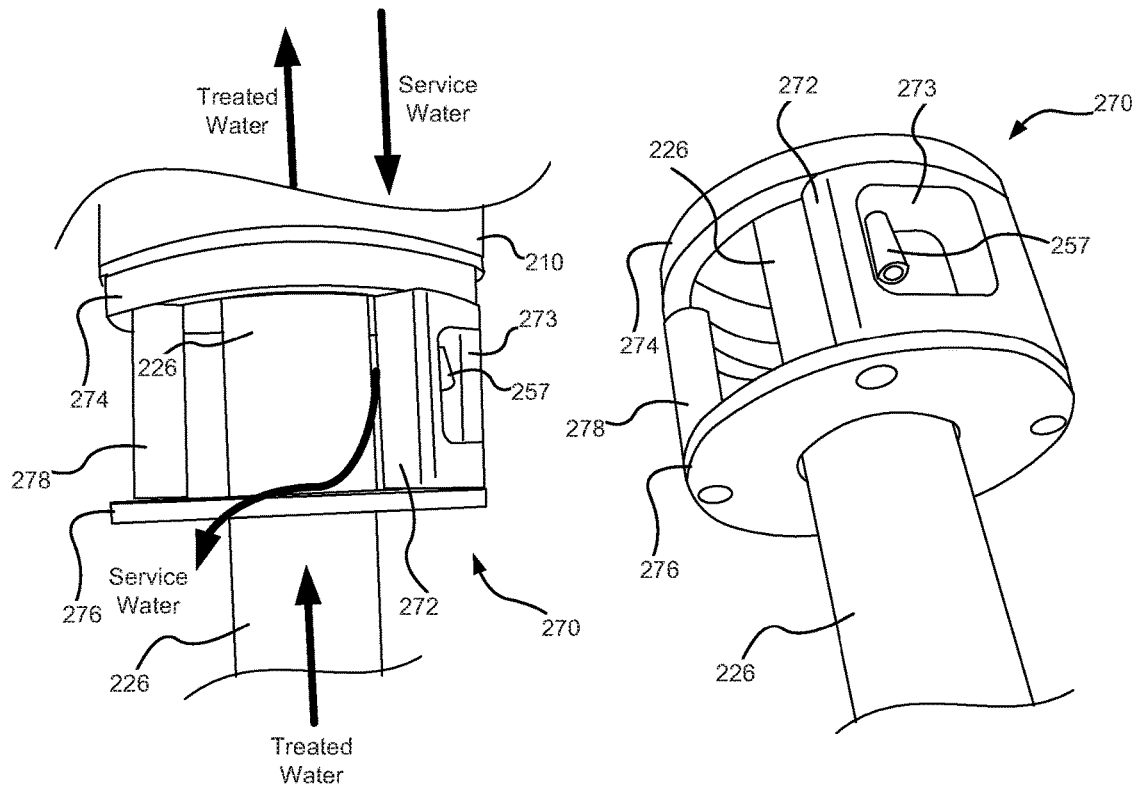
FIG. 2F
FIG. 2G
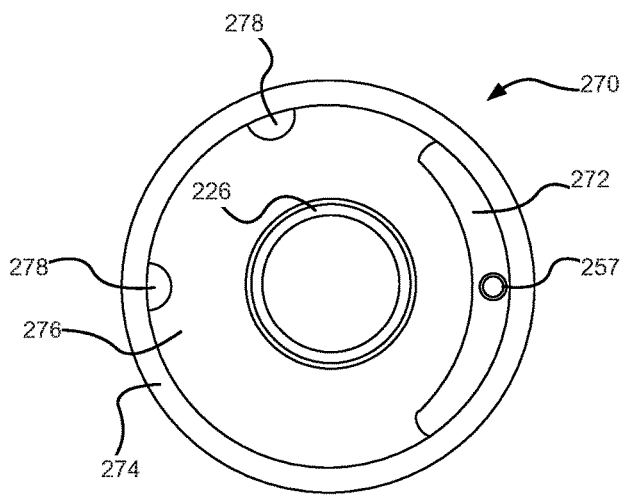
FIG. 2H

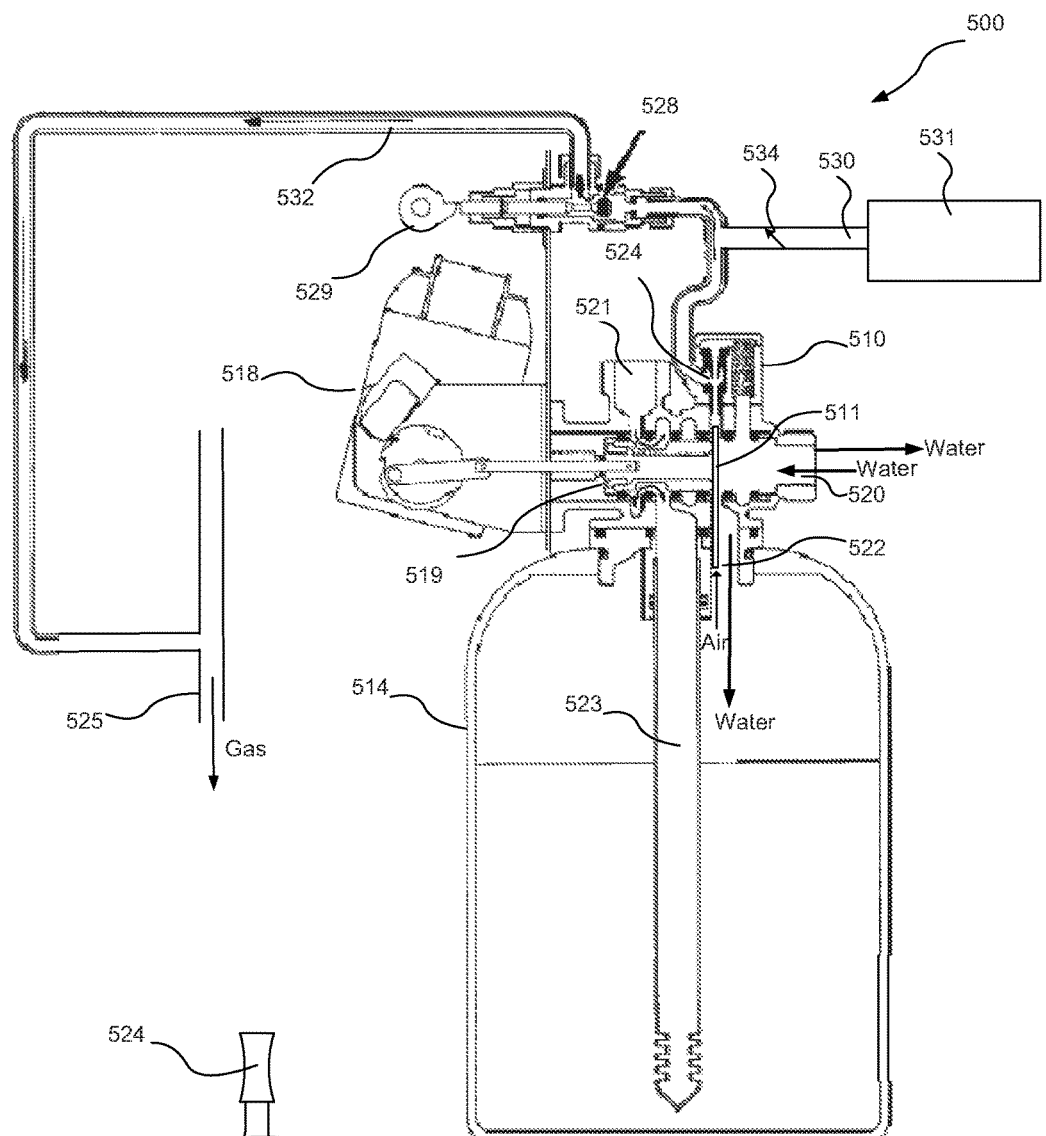
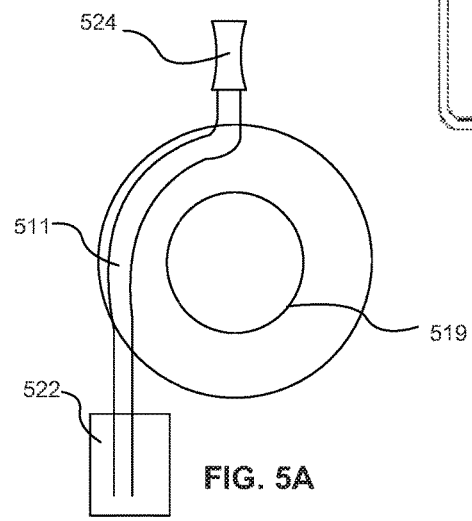
FIG. 5
FIG. 5A

AERATION CONTROL VALVE SYSTEM
WITH BYPASS GAS RELEASE PASSAGE
FOR WATER TREATMENT SYSTEM AND
METHODS FOR USING SAME

TECHNICAL FIELD

The present invention relates to water treatment systems and more particularly, to an aeration control valve system with a bypass gas release passage to facilitate gas charge and gas release in an aerated water treatment system.

BACKGROUND INFORMATION

Water treatment systems are commonly used in water supply systems. In a residential water supply system, for example, water softeners, acid neutralizers, iron/manganese removal systems, arsenic removal systems, ozone systems and aeration systems may be used to filter or treat the water being supplied from a water source (e.g., from a well or city water supply). To facilitate the removal of contaminants, such as iron, manganese, and sulfur, some water treatment systems aerate the water to provide oxidation prior to the filtering. In such systems, a head of gas may be maintained at the top of a water treatment tank such that the water provided to the tank passes through the head of gas before passing through filter media.

Some existing water treatment systems include a control valve (e.g., connected to the top of the tank) to control the water passing in to and out of the system according to water treatment operating cycles. To provide the head of gas in an existing water treatment system that uses aeration, the control valve may perform a gas charge cycle by directing water through a venturi coupled to a gas inlet such that the venturi draws gas into the top of the filter tank. During a service cycle, the control valve directs the water to flow through the trapped gas in the tank, through filter media in the tank, and then to a service water system (e.g., a residential water system). The old compressed gas in the tank may be released or discharged when the control cycle opens a drain line during a backwash cycle.

The use of these existing water treatment systems providing aeration presents several drawbacks. One such drawback is the need for a backwash cycle before a gas charge cycle to release gas and provide a new charge of gas. Although water treatment systems have been designed to allow the release of gas without requiring a backwash cycle, some of these systems may only release gas when water is not being used. Such systems may require the service flow to be monitored to be sure the gas release occurs when water is not flowing.

BRIEF DESCRIPTION OF THE DRAWINGS

These and other features and advantages will be better understood by reading the following detailed description, taken together with the drawings wherein:

FIG. 2A is a perspective view of a valve spacer stack assembly for use in the aeration control valve shown in FIG. 2.

FIG. 2B is a perspective view of a modified bypass valve spacer used in the valve spacer stack assembly shown in FIG. 2A.

FIG. 2C is an elevation view of the bypass valve spacer shown in FIG. 2B.

FIG. 2D is a perspective view of a bypass O-ring for use in the modified bypass valve spacer shown in FIG. 2B.

FIG. 2E is a side schematic view of the modified bypass valve spacer and O-ring assembly providing bypass gas release flow.

FIG. 2F is a side perspective view of an embodiment of the water shielding assembly used in the aeration control valve shown in FIG. 2.

FIG. 2G is a bottom perspective view of the embodiment of the water shielding assembly shown in FIG. 2F.

FIG. 2H is a top plan view of the embodiment of the water shielding assembly shown in FIG. 2F.

FIG. 5 is a cross-sectional view of a further embodiment of an aeration control valve with a bypass gas release passage during a gas release cycle.

FIG. 5A is a schematic illustration of the bypass gas release passage around the piston body in the aeration control valve shown in FIG. 5.

DETAILED DESCRIPTION

An aeration control valve system with a bypass gas release passage, consistent with embodiments of the present disclosure, may be used with an aerated water treatment system to control aeration and flow of water and gas (e.g., air or ozone) in accordance with various operating cycles. The aeration control valve system causes gas to be pumped or drawn into the water treatment system during a gas charge or draw cycle to provide a gas charge for aerating the water to facilitate water treatment. The aeration control valve system releases the gas during a gas release cycle while allowing the water treatment system to remain "in service" to continue to treat the water. To allow gas release when water is flowing during service, the bypass gas release passage is located external to or within the aeration control valve system and bypasses a flow region of the water that flows during service.

Examples of water treatment systems include, but are not limited to, water softeners, acid neutralizers, iron/manganese removal systems, arsenic removal systems, other contaminant removal systems, aeration systems and ozone systems. Water treatment systems may include tanks or other devices that store or allow water to pass through as part of a treatment process. The water treatment systems may also include redundant water treatment tanks (e.g., redundant arsenic removal systems) or may include different water treatment tanks (e.g., an acid neutralizer and a water softener). Water treatment systems may also include water heaters or other devices that alter the temperature or other conditions of the water.

As used herein, "aeration" refers to exposing a liquid to gas including, but not limited to, air and ozone gas. As such, aerated water systems or aeration systems include systems that expose water to ozone gas as well as systems that expose water to air. As used herein, "fluid connection" refers to a connection between elements that allows fluid to flow between the elements and "fluidly couple" refers to coupling elements in a manner that allows a fluid connection between the elements. The terms "couple" and "connection" are not limited to a direct mechanical connection and may include an indirect mechanical connection that is made through other components or structures.

Figure 1:
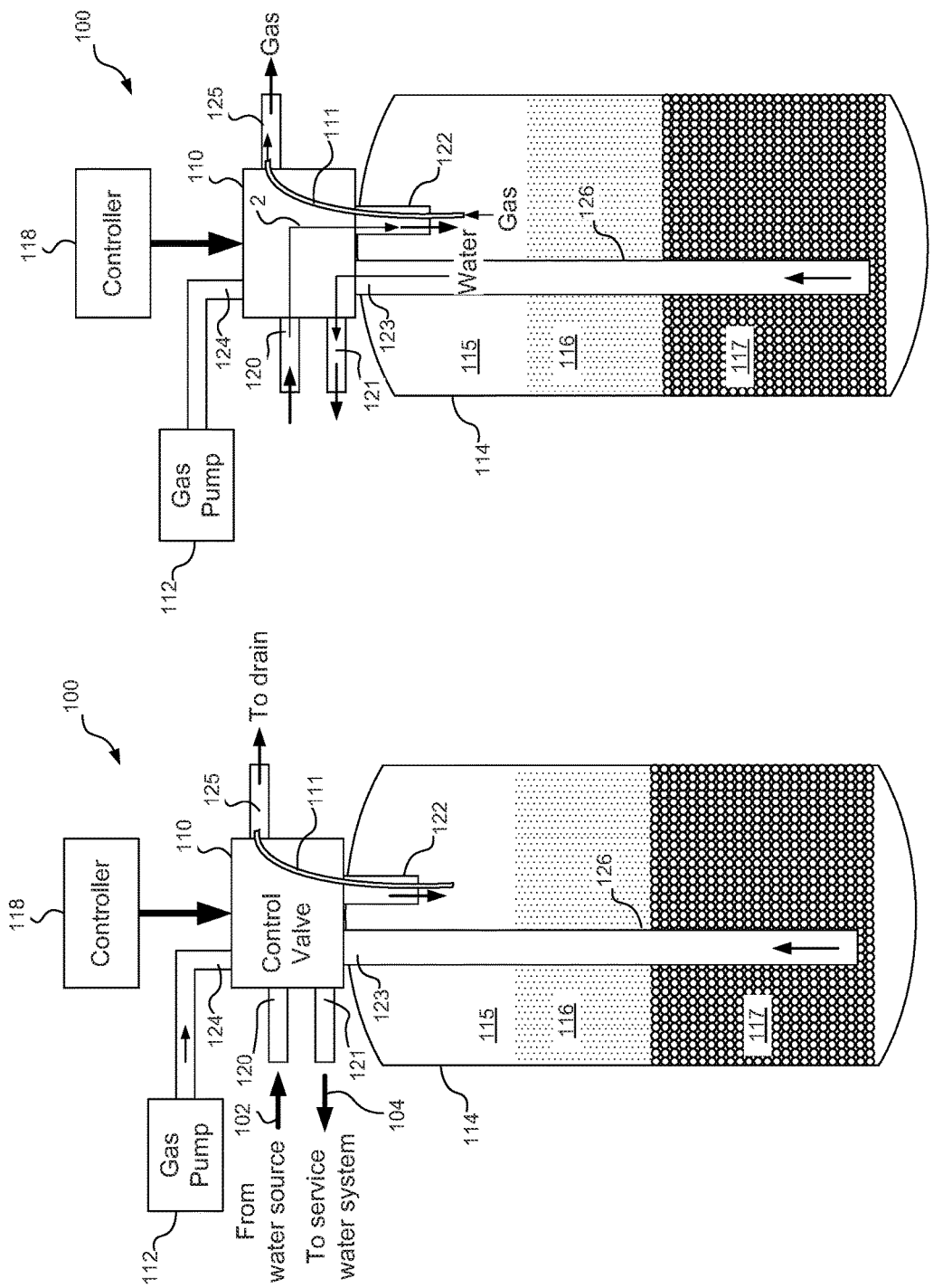
FIG. 1A is a schematic view of a water treatment system including an aeration control valve system with a bypass gas release passage, consistent with an embodiment of the present invention.
FIG. 1B is a schematic view of the water treatment system in FIG. 1A illustrating flow of water and gas through the aeration control valve system during a gas release cycle.

Referring to FIGS. 1A and 1B, a water treatment system 100, consistent with an embodiment, includes an aeration control valve 110 with a bypass gas release passage 111 that is fluidly coupled to a drain outlet 125. In this embodiment, the aeration control valve 110 is fluidly coupled to a gas pump 112 (e.g., an air pump), a water treatment tank 114, and various inlets and outlets. The aeration control valve 110 controls the flow of gas and water in to and out of the water treatment tank 114, and the gas pump 112 pumps gas into the tank 114 to provide aeration. The water treatment tank 114 may contain a gas charge 115, aerated water 116 to be treated, and filter media 117 for filtering the aerated water 116. In other embodiments, a venturi may be used instead of the gas pump 112 to provide aeration.

To provide water treatment, the water treatment system 100 directs water from a supply line 102 through the water treatment tank 114 to a delivery line 104. The supply line 102 may supply water from a water source such as a well or city water supply. The delivery line 104 may provide water to a service water system in a building, such as a residential home. The water treatment system 100 may be coupled, for example, to a residential water supply system at the point of entry. The water treatment system 100 may also be configured for use in a commercial water supply system.

The control valve 110 may include a supply water inlet passage 120, a service water outlet passage 121, first and second tank passages 122, 123, a gas passage 124, and a drain outlet passage 125. The supply water inlet passage 120 may be fluidly coupled to the supply line 102 and the service water outlet passage 121 may be fluidly coupled to the delivery line 104. The first and second tank passages 122, 123 are coupled to the water treatment tank 114 for passing water in to and out of the tank 114. In one embodiment, the second tank passage 123 is coupled to a conduit 126 that extends into the filter media 117 proximate the bottom region of the water treatment tank 114. The gas passage 124 is coupled to the gas pump 112 (or some other source of gas) for directing the pumped gas into the tank 114. The drain outlet passage 125 may be coupled to a drain for directing water from the tank 114 to the drain.

The water treatment system 100 aerates the water 116 as it passes through the gas charge 115 in the water treatment tank 114 and then filters the aerated water 116 as it passes through filter media 117. In one example, iron, manganese and hydrogen sulfide gas dissolved in the water 116 is oxidized when exposed to the gas charge 115 and becomes a solid precipitate that can be trapped in the filter media 117. The filter media 117 includes any type of filter media capable of trapping the contaminants to be removed. The aeration control valve 110 may be used with various types and configurations of water treatment systems. In other embodiments, the water treatment system 100 may be used without the filter media 117. In further embodiments, the water treatment system 100 may include an aeration tank (without filter media) followed by a filter tank (with filter media), which allows regeneration of a gas charge (e.g., air or ozone) while the filter tank is in service.

The control valve 110 may also include a valve cycle actuator (not shown) that provides fluid connections between the passages 120-125 based on different positions of the valve cycle actuator. The control valve 110 controls the flow of water and/or gas between the passages 120-125 and in to and out of the water treatment tank 114, for example, according to the various water treatment cycles or operations. In a water softener, for example, a control valve assembly may provide different positions (e.g., a service position, a backwash position, a gas charge or regeneration position, a gas release position, and a rinse position) allowing water and/or gas to flow according to different water softener treatment cycles.

The bypass gas release passage 111 extends from the first tank passage 122 to a point beyond the flow region of water 2 flowing from the supply water inlet passage 120 (FIG. 1B) and is fluidly coupled to the drain outlet passage 125. The bypass gas release passage 111 thus bypasses the flow of water 2 into the water treatment tank 114. The bypass gas release passage 111 may include, for example, a tube or piping capable of forming a gas passage between a region including the gas to be released (e.g., the gas charge 115) and the point beyond the flow region, as will be described in greater detail below. The bypass gas release passage 111 may extend through the supply water inlet passage 122 into the tank 114 (as shown) or may extend from a location inside the supply water inlet passage 122. Although the bypass gas release passage 111 is shown as a single passage, the bypass gas release passage 111 may be a series of fluidly coupled passages (e.g., a tube coupled to a passage around the valve actuator) and may also be operably coupled to the valve actuator such that the valve actuator controls the flow of gas through the bypass gas release passage 111. Although the bypass gas release passage 111 is shown inside the control valve 110, the bypass gas release passage 111 may also run externally around the control valve 110 and directly into the tank 114.

During a service cycle, the water treatment system 100 is "in service" treating water and directing the treated water to the service water system. In this embodiment, the aeration control valve 110 directs untreated water from the first tank passage 122 to the top region of the tank 114 such that the water passes through the charge of gas 115. The treated water may be drawn from the bottom region of the tank (i.e., after passing through the filter media 117) through the conduit 126 coupled to the second tank passage 123. The aeration control valve 110 may substantially prevent gas 115 from escaping from the tank 114 during the service cycle, thereby maintaining the gas charge for aeration during filtering.

During a gas release cycle, as shown in FIG. 1B, the aeration control valve 110 allows gas 115 in the water treatment tank 114 to pass through the bypass gas release passage 111 to the drain passage 125. During the gas release cycle, the aeration control valve 110 also directs untreated water from the supply water inlet passage 120 to the first tank passage 122 and directs treated water from the second tank passage 123 to the service water outlet passage 121. Thus, the bypass gas release passage 111 may positively release gas while the water treatment system 100 is "in service" and while water is flowing through the valve 110 and into the water treatment tank 114 for treatment.

The water treatment system 100 and aeration control valve 110 may also perform other water treatment cycles or operations, such as a backwash cycle and/or a gas charge cycle, for example, as described in greater detail in U.S. Pat. No. 8,691,091, which are commonly-owned and incorporated herein by reference. The aeration control valve 110 may perform this gas release cycle, for example, prior to a gas charge cycle or prior to a backwash cycle, and the gas may be released relatively slowly (e.g., at a rate of 0.5 CFM or less) to prevent a sudden depressurization. By performing a gas release cycle prior to a backwash cycle, the release of gas may be controlled to prevent the gas charge from rushing out to the drain during backwash, thereby preventing noise, rattling, flooding, and loss of filter media.

In one embodiment, the gas pump 112 coupled to the aeration control valve 110 may be an atmospheric gas pump capable of providing gas pressures in a range of about 1 to 25 psi. In another embodiment, the gas pump 112 coupled to the aeration control valve 110 may be a high pressure gas pump capable of providing gas pressures greater than about 25 psi. An aeration control valve system including a high pressure gas pump is capable of providing a service/gas charge cycle in which the water treatment system 100 regenerates a gas charge in the water treatment tank 114 while also treating the water.

The control valve 110 may include user controls on a side thereof to allow the user to control valve functionality such as when certain treatment cycles or operations occur (e.g., based on a time of day or number of days or number of gallons used). A controller 118 may also be coupled to the control valve 110 to control operation of the control valve 110 and initiation of the cycles of operation, for example, according to a programmed schedule. Other types of controls may also be provided.

Figure 2:
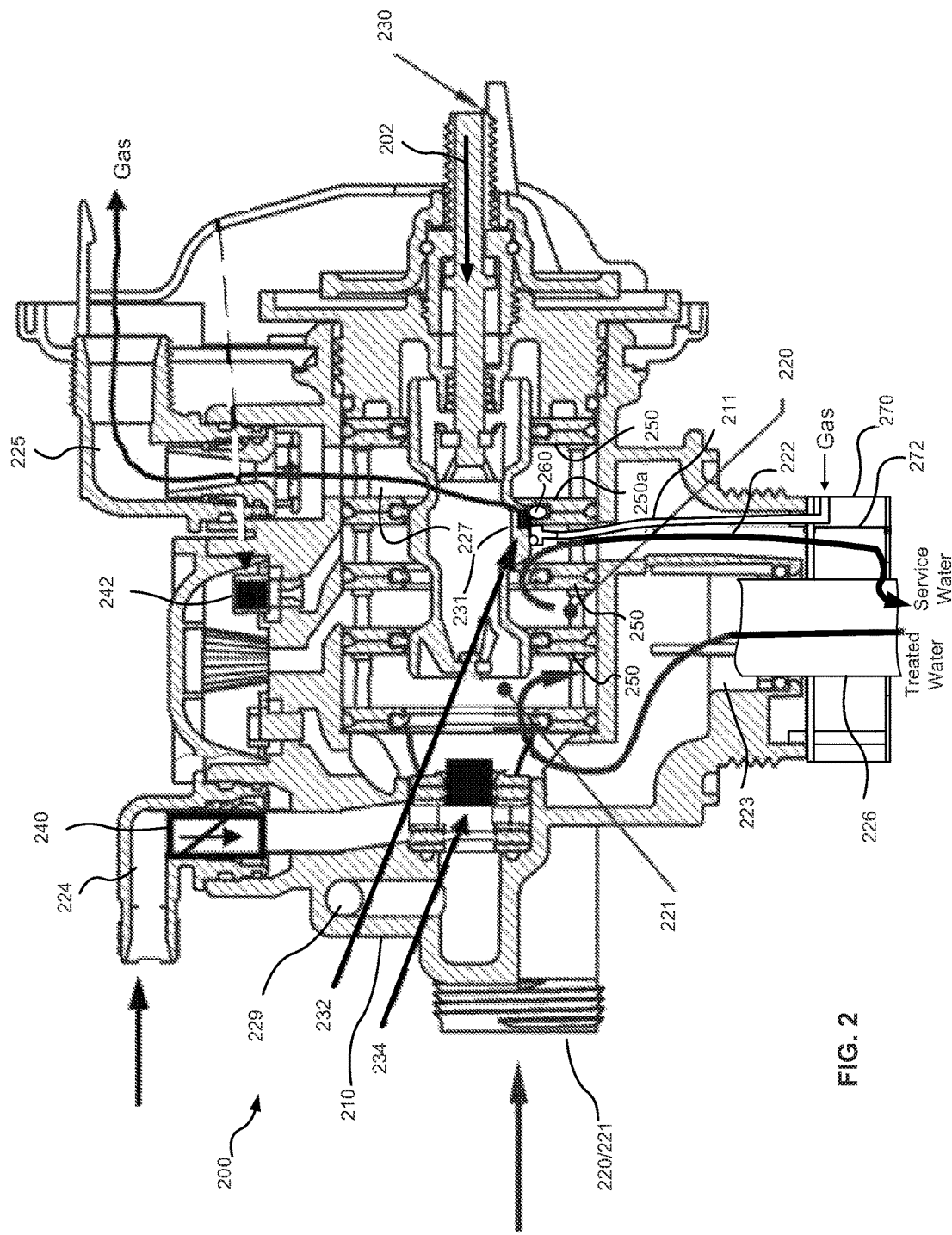
FIG. 2 is a cross-sectional view of one embodiment of an aeration control valve with a bypass gas release passage during a gas release cycle.

Referring to FIG. 2, an embodiment of an aeration control valve 200 may be based on a WS Series control valve available from Clack Corporation with some modifications to allow gas to be pumped and released through the valve body 210. The aeration control valve 200 includes a valve body 210, a supply water inlet passage 220, a service water outlet passage 221, first and second tank passages 222, 223, a gas passage 224 and a drain passage 225. A bypass gas release passage 211, such as a tube, is fluidly coupled to the drain passage 225 via a valve passage 227 to allow gas to be released to the drain passage 225 while "in service" and during water flow.

According to this embodiment, a valve actuator 230 moves a valve piston body 231 within the valve body 210 to provide a fluid connection between the passages 220-225. A high pressure gas pump (not shown) is coupled to the gas passage 224 to pump gas at higher pressures (e.g., greater than 25 psi) into the gas passage 224 and through a gas manifold 229 in the control valve 200.

The aeration control valve 200 may include, for example, a check valve 240 located in the gas passage 224 such that gas may be pumped through the check valve 240 into the control valve 200 without allowing the gas to pass out of the control valve 200 through the check valve 240. The aeration control valve 200 may be a WS Series valve originally designed for venturi aeration but with a plug 242 plugging the injector used for the aeration. Because a gas pump pumps the gas into the gas passage 224, the gas may be forced through the gas manifold 229 without using water to draw the gas in through the venturi injector.

In this embodiment, the valve piston body 231 may be modified such that the piston body 231 does not extend into and block the pathway between the gas passage 224 and the gas manifold 229. A piston plug 234 may be used to maintain an open pathway between the gas passage 224 and the gas manifold 229 instead of allowing an end portion of the piston body 231 to open and close the pathway. The valve piston body 231 may also have a notched portion 232 configured to allow gas to pass from the first tank passage 222 to the drain passage 225 via the bypass gas release passage 211 when located in a certain position. During a gas release cycle, the valve piston body 231 is located in a position that allows gas to pass from the first tank passage 222 through the bypass gas release passage 211 and the notched portion 232 in the valve actuator piston 230 to the drain passage 225 while also allowing water to flow from the supply water inlet passage 220 to the first tank passage 222 and from the second tank passage 223 to the service water outlet passage 221. A water shielding assembly 270 is mounted to a bottom of the valve body 210 and includes a shield 272 to shield the end of the gas release passage 211 from the service water flowing out of the first tank passage 222 and thus prevents service water from entering the gas release passage 211, as will be described in greater detail below.

In the illustrated embodiment, the valve actuator 230 and piston body 231 move in the direction of arrow 202 sequentially from a service/gas charge cycle position (not shown) to a gas release cycle position (as shown) to the backwash cycle position (not shown) and then to the rinse cycle position (not shown). The direction of the valve piston body 231 may then be reversed to move back to the service/gas charge cycle position (not shown). In one embodiment, a drive mechanism may be coupled to the valve piston body 231 to cause the piston to move to each of the cycle positions. The drive mechanism may include, for example, a drive wheel that rotates to cause linear movement of the valve actuator 230 (e.g., using a lead screw to provide linear actuation), one or more gears engaging the drive wheel, and a motor for driving the gear(s). The various operation cycles for this type of aeration control valve 200 are described in greater detail in U.S. Pat. No. 8,691,091, which is commonly-owned and incorporated herein by reference.

In the illustrated embodiment, the valve piston body 231 moves through a valve spacer stack assembly formed by a series of valve spacers 250 including a bypass valve spacer 250a fluidly coupled to the gas release passage 211. The bypass valve spacer 250a may be a modified version of the valve spacers 250, which has been modified to allow fluid coupling to a tube forming the gas release passage 211. A bypass O-ring 260 is located in the bypass valve spacer 250a to seal against the valve piston body 231 and around the notched portion 232.

FIGS. 2A-2E illustrate the valve spacer stack assembly and the modified bypass valve spacer 250a and modified O-ring 260 in greater detail. The bypass valve spacer 250a includes an annular body portion 252 defining a piston aperture 251 that receives the valve piston body 231. A bypass protuberance 254 extends from the annular body portion 252 in a generally axial direction relative to the annular body portion 252 and the valve piston body 231 (when received in the piston aperture 251). The bypass protuberance 254 defines a bypass passage section 258 and includes a connecting portion 256, such as a tubing barb connection, for fluidly connecting tubing to the bypass passage section 258.

As shown in FIG. 2E, when a tube 257 is connected to the connecting portion 256, the gas release passage 211 defined by the tube 257 is fluidly coupled to the bypass passage section 258 to allow released gas to flow through the notched portion 232 of the piston body 231. As shown in FIG. 2, the released gas may then flow around the piston body 231, into the valve passage 227, and out of the drain passage 225. The fluid coupling between the tube 257 and the bypass valve spacer 250a thus forms the gas release passage 211 between a region beyond the flow region of the first tank passage (see FIG. 2) and the drain passage 225.

The bypass O-ring 260 is positioned in grooves 253, 255 of the bypass valve spacer 250a to seal against the piston body 231 and around the notched portion 232. The bypass O-ring 260 includes a main O-ring body portion 262 and a bypass O-ring portion 264 extending in the generally axial direction. The main O-ring body portion 262 is seated in a main O-ring groove 253 in the main body portion 252 around the piston aperture 251 and the bypass O-ring portion 264 is seated in a bypass O-ring groove 255 in the bypass protuberance 254 around the bypass passage section 258. As shown in FIG. 2E, the bypass O-ring portion 264 seals around the notched portion 232 when the piston body 231 is in the gas release cycle position. The main O-ring body portion 262 seals against the piston body 231 in other cycle positions.

FIGS. 2F-2H illustrate the water shielding assembly 270 in greater detail. In general, the water shielding assembly 270 provides a shield 272 between the end of the tube 257 and service water that flows out of the first tank passage (not shown). In the illustrated embodiment, the water shielding assembly 270 includes a top ring 274 and a bottom diffuser plate 276 spaced from the top ring 274 by one or more stand offs 278 secured by screws. The top ring 274 may include a bayonet type connection for coupling to the bottom of the valve body 210. A pipe 226 coupled to the second tank passage (not shown) extends down through the top ring 274 and through the bottom diffuser plate 276 into the tank (not shown).

In this embodiment, the shield 272 is also positioned between the top ring 274 and the bottom diffuser plate 276 at one side and includes a recessed region 273. The tube 257 extends from the first tank passage and through the shield 272 such that an end of the tube 257 is located in the recessed region 273 in the shield 272. The shield 272 may be formed by a section of PVC, which has been hollowed out to form the recessed region 273 and to form a hole that allows the tube 257 to extend through. The hole may be sized with a smaller diameter such that a seal is formed around the tube 257 or a separate seal may be used to seal around the hole between the tube 257 and the shield 272.

In use, the treated water flowing out of the tank (not shown) flows up through the pipe 226 and the service water flowing into the tank from the first tank passage flows through the top ring 274 outside of the pipe 226. The service water flowing in splashes onto the bottom diffuser plate 276, which directs the water to the tank while the shield 272 shields the end of the tube 257 from the service water.

Figure 3B:
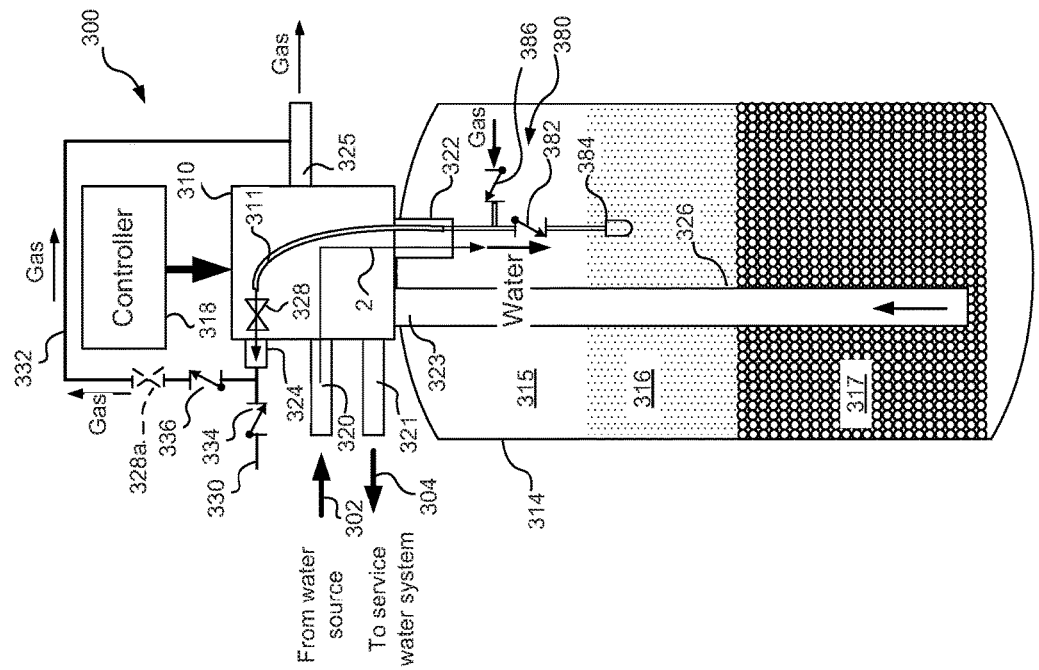
FIG. 3B is a schematic view of the water treatment system in FIG. 3A illustrating flow of water and gas through the aeration control valve system during a gas release cycle.
Figure 3A:
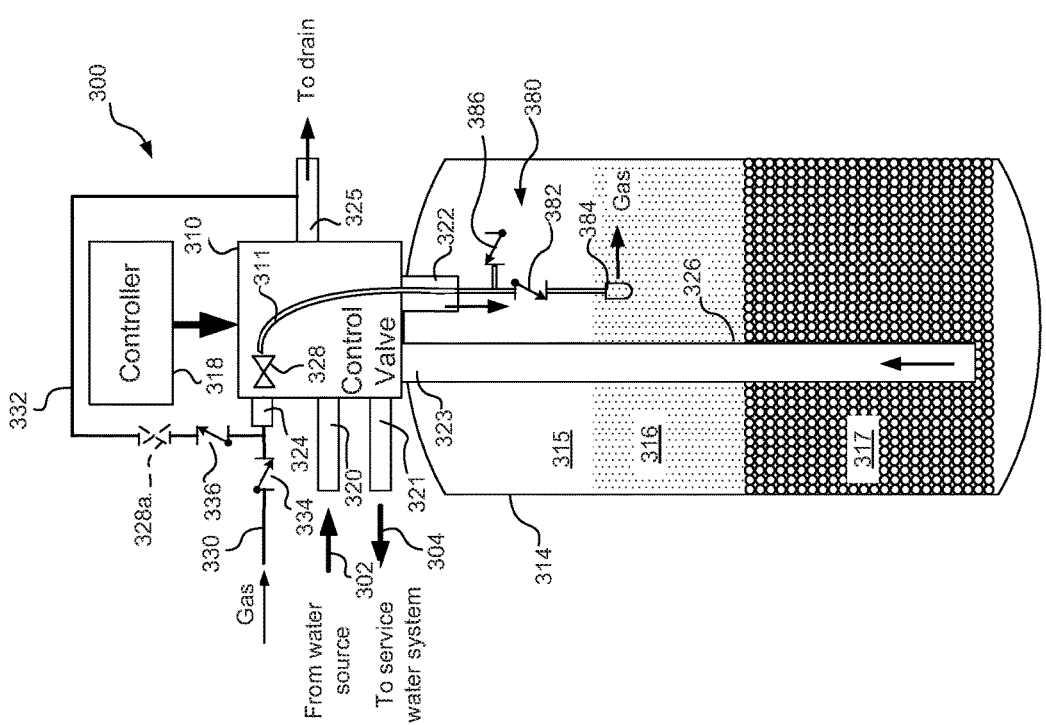
FIG. 3A is a schematic view of a water treatment system including an aeration control valve system with a bypass gas release passage, consistent with another embodiment of the present invention.

Referring to FIGS. 3A and 3B, a water treatment system 300, consistent with another embodiment, includes an aeration control valve 310 with a bypass gas release passage 311 fluidly coupled to a gas passage 324. This embodiment of the aeration control valve 310 is fluidly coupled to a water treatment tank 314 and controls the flow of gas (e.g., air or ozone) and water in to and out of the water treatment tank 314. The gas may be pumped or drawn into the tank 314 during a gas charge cycle and released or discharged during a gas discharge or release cycle without requiring a backwash. The water treatment tank 314 may contain a gas charge 315, aerated water 316 to be treated, and filter media 317 for filtering the aerated water 316.

To provide water treatment, the water treatment system 300 directs water from a supply line 302 through the water treatment tank 314 to a delivery line 304. The supply line 302 may supply water from a water source such as a well or city water supply. The delivery line 304 may provide water to a service water system in a building, such as a residential home. The water treatment system 300 may be coupled, for example, to a residential water supply system at the point of entry. The water treatment system 300 may also be configured for use in a commercial water supply system.

The water treatment system 300 aerates the water 316 as it passes through the gas charge 315 in the water treatment tank 314 and then filters the aerated water 316 as it passes through filter media 317. In one example, iron, manganese and hydrogen sulfide gas dissolved in the water 316 is oxidized when exposed to the gas charge 315 and becomes a solid precipitate that can be trapped in the filter media 317. The filter media 317 includes any type of filter media capable of trapping the contaminants to be removed. The aeration control valve 310 may be used with various types and configurations of water treatment systems including systems without filter media. In further embodiments, the water treatment system 300 may include an aeration tank (without filter media) followed by a filter tank (with filter media), which allows regeneration of a gas charge (e.g., air or ozone) while in service.

The control valve 310 may include a supply water inlet passage 320, a service water outlet passage 321, first and second tank passages 322, 323, a gas passage 324, and a drain outlet passage 325. The supply water inlet passage 320 may be fluidly coupled to the supply line 302 and the service water outlet passage 321 may be fluidly coupled to the delivery line 304. The first and second tank passages 322, 323 are fluidly coupled to the water treatment tank 314 for passing water in to and out of the tank 314. In the illustrated embodiment, the second tank passage 323 is fluidly coupled to a conduit 326 that extends into the filter media 317 proximate the bottom region of the water treatment tank 314. The drain outlet passage 325 may be coupled to a drain for directing water from the tank 314 to the drain.

A gas intake inlet 330 is fluidly coupled to the gas passage 324 for supplying gas into the tank 314, for example, using a pump to pump the gas or a venturi to draw the gas, as described in greater detail below. A gas release outlet 332 is fluidly coupled to the gas passage 324 for releasing gas from the system 300, for example, to the drain outlet passage 325. A gas intake check valve 334 is coupled to the gas intake inlet 330 to allow gas to be supplied to the gas passage 324 without allowing released gas to pass out of the gas intake inlet 330. The gas intake check valve 334 may be configured to open under vacuum or with an atmospheric gas pump, as described below. A gas release check valve 336 is coupled to the gas release outlet 332 to allow gas to be released from the gas passage 324 without allowing the released gas to pass back into the gas passage 324. The gas release check valve 336 may be configured with a high tension spring to assure a firm seal such that, when the gas is pumped into the gas passage 324, no gas is pumped through the gas release check valve 336 to the gas release outlet 332 and drain passage 325. Thus, gas release and gas intake may be provided through a single connection to the gas passage 324.

A gas valve 328, 328a controls the supply and/or release of gas to and/or from the tank 314. An internal gas valve 328, for example, may be located within the control valve 310 and fluidly coupled to the gas passage 324. Alternatively, an external gas valve 328a may be located external to the control valve 310 and fluidly coupled to the gas release outlet 332. When the external gas valve 328a is used, the gas release check valve 336 may not be necessary.

The control valve 310 may also include a valve cycle actuator (not shown) that provides fluid connections between the passages 320-325 based on different positions of the valve cycle actuator. The control valve 310 controls the flow of water and/or gas between the passages 320-325 and in to and out of the water treatment tank 314, for example, according to the various water treatment cycles or operations. In one embodiment, for example, a control valve assembly may provide different positions (e.g., a service position, gas release position, a backwash position, and a gas draw or charge position) allowing water and/or gas to flow according to different water treatment cycles.

The bypass gas release passage 311 extends from the first tank passage 322 to a point beyond the flow of water 2 flowing from the supply water inlet passage 320 (FIG. 3B) and is fluidly coupled to the gas passage 324. The bypass gas release passage 311 thus bypasses the flow of water 2 into the treatment tank 314. The bypass gas release passage 311 may include, for example, a tube or piping capable of forming a gas passage between a region including the gas to be released (e.g., the gas charge 315) and the point beyond the flow region. The bypass gas release passage 311 may extend from a location inside the supply water inlet passage 322 (as shown) or may extend through the supply water inlet passage 322 into the tank 314. Although the bypass gas release passage 311 is shown as a single passage, the bypass gas release passage 311 may be a series of fluidly coupled passages and may also be operably coupled to the valve actuator such that the valve actuator controls the flow of gas through the bypass gas release passage 311. Although the bypass gas release passage 311 is shown inside the control valve 310, the bypass gas release passage 311 may also run externally around the control valve 310 and directly into the tank 314.

A gas injection and release system 380 may be fluidly coupled to the gas release passage 311 and located in the tank 314 to provide both gas injection into the water 316 and gas release. In the illustrated embodiment, the gas injection and release system 380 includes an injection check valve 382 coupled to a gas injector 384 to allow injected gas to be directly injected into the water 316 (see FIG. 3A) and a release check valve 386 to allow released gas to flow into the gas release passage 311 (see FIG. 3B).

During a service cycle, the water treatment system 300 is "in service" treating water and directing the treated water to the service water system. In this embodiment, the aeration control valve 310 directs untreated water from the supply water inlet passage 320 to the first tank passage 322 and directs treated water from the second tank passage 323 to the service water outlet passage 321. The untreated water from the first tank passage 322 may be directed to the top region of the tank 314 such that the water passes through the charge of gas 315. The treated water may be drawn from the bottom region of the tank (i.e., after passing through the filter media 317) through the conduit 326 coupled to the second tank passage 323. The aeration control valve 310 (e.g., the gas valve 328) may also substantially prevent gas 315 from escaping from the tank 314 during the service cycle, thereby maintaining the gas charge for aeration during filtering.

During a gas release cycle, as shown in FIG. 3B, the aeration control valve 310 allows gas 315 in the water treatment tank 314 to pass through the bypass gas release passage 311 to the gas passage 324 and then through the gas release outlet 332 to the drain passage 325. In particular, the gas valve 328, 328a is actuated to allow the gas to be released into the gas passage 324 and the gas release check valve 386 allows the gas to enter the gas release passage 311. During the gas release cycle, the aeration control valve 310 may also direct untreated water from the supply water inlet passage 320 to the first tank passage 322 and direct treated water from the second tank passage 323 to the service water outlet passage 321. Thus, the bypass gas release passage 311 may positively release gas while the water treatment system 300 is "in service" and while water is flowing through the valve 310 and into the water treatment tank 314 for treatment.

The water treatment system 300 and aeration control valve 310 may also perform other water treatment cycles or operations, such as a backwash cycle and/or a gas charge cycle, for example, as described in greater detail in U.S. Pat. No. 9,290,397, which is commonly-owned and incorporated herein by reference. The aeration control valve 310 may perform this gas release cycle, for example, prior to a gas charge cycle or prior to a backwash cycle, and the gas may be released relatively slowly (e.g., at a rate of 0.5 CFM or less) to prevent a sudden depressurization. By performing a gas release cycle prior to a backwash cycle, the release of gas may be controlled to prevent the gas charge from rushing out to the drain during backwash, thereby preventing noise, rattling, flooding, and loss of filter media.

In one embodiment, a gas pump (not shown) coupled to the aeration control valve 310 may be an atmospheric gas pump capable of providing gas pressures in a range of about 0.1 to 25 psi. In another embodiment, the gas pump coupled to the aeration control valve 310 may be a high pressure gas pump capable of providing gas pressures greater than about 25 psi. An aeration control valve system including a high pressure gas pump may be capable of providing a service/gas charge cycle in which the water treatment system 300 provides a gas charge in the water treatment tank 314 while also treating the water. In other embodiments, a venturi may be coupled to the aeration control valve 310 to draw gas into the water treatment tank with the water.

The control valve 310 may include user controls on a side thereof to allow the user to control valve functionality such as when certain treatment cycles or operations occur (e.g., based on a time of day or number of days or number of gallons used). A controller 318 may also be coupled to the control valve 310 to control operation of the control valve 310 and initiation of the cycles of operation, for example, according to a programmed schedule. Other types of controls may also be provided.

As will be described in greater detail below, the aeration control valve 310, consistent with embodiments described herein, may be based on an existing control valve such as the Fleck 1500, Fleck 2510, Fleck 5600SXT, Fleck 5800SXT, and Fleck 5810, 5812, and other control valves available from Pentair, Inc.

Figure 4:
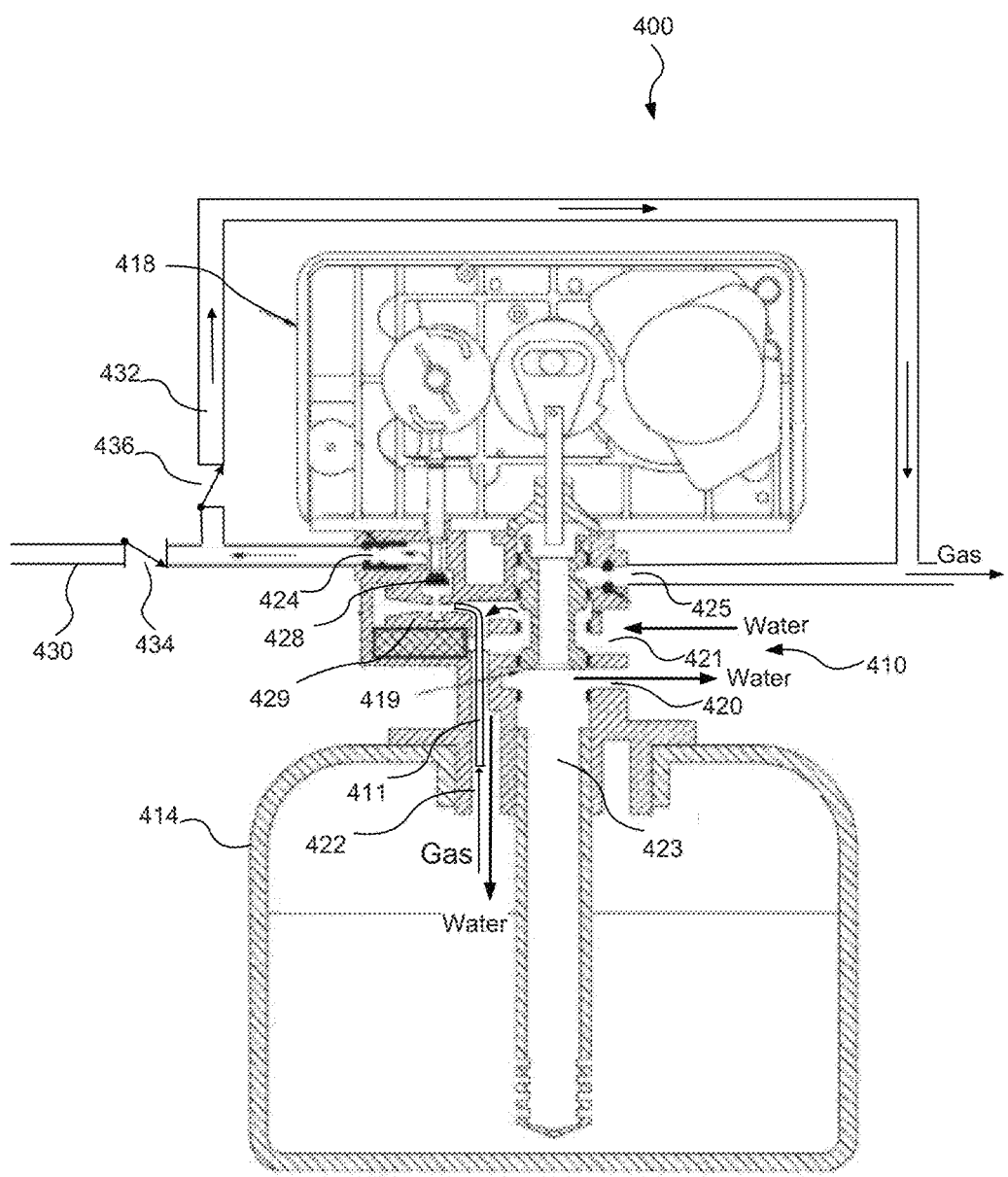
FIG. 4 is a cross-sectional view of another embodiment of an aeration control valve with a bypass gas release passage during a gas release cycle.

Referring to FIG. 4, one embodiment of an aeration control valve 400 is based on a Fleck 5600SXT control valve available from Pentair, Inc., which was originally configured for connection to a brine tank. In this embodiment, the aeration control valve 400 is configured with a gas passage 424 being used to supply and release gas instead of being connected to a brine tank. A bypass gas release passage 411 is fluidly coupled to the gas passage 424 to positively release gas to the gas passage 424 while "in service" and during water flow. Fleck 5800 series control valves may be modified in a similar way.

The aeration control valve 400 includes a valve body 410 and a controller 418. The valve body 410 is coupled to a tank 414 and defines a supply water inlet passage 420, a service water outlet passage 421, first and second tank passages 422, 423, the gas passage 424 and a drain passage 425. According to this embodiment, a valve actuator piston 419 moves within the valve body 410 to provide a fluid connection between the passages 420-425.

A gas intake inlet 430 is fluidly coupled to the gas passage 424, and a gas release outlet 432 is fluidly coupled between the gas passage 424 and the drain 425. A gas intake check valve 434 is coupled to the gas intake inlet 430 and a gas release check valve 436 is coupled to the gas release outlet 432. When a gas pump is used, the gas release check valve 436 includes a high tension spring to assure a firm seal such that gas is pumped into the gas passage 424 but not through the gas release check valve 436 to the gas release outlet 432. In this embodiment, an internal gas valve 428 controls the release of gas to the gas passage 424 and the supply of gas from the gas passage 424. The internal gas valve 428 may be the same as the brine safety valve that previously was used to allow brine tank fill and brine draw. This embodiment of the aeration control valve 400 also includes a venturi 429 that draws gas in through the gas inlet 430 to the gas passage 424 when water flows through the venturi 429. In this embodiment, the bypass gas release passage 411 extends from the first tank passage 422 to the venturi 429. Alternatively, an atmospheric gas pump (not shown) may be coupled to the gas intake inlet 430 to pump gas into the gas passage 424.

During a gas release cycle, the gas valve 428 is opened and the valve actuator piston 419 is located at a position that allows gas to be released from the tank 414, through the bypass gas release passage 411, and into the gas passage 424. In this embodiment of the aeration control valve 400, which was originally configured for connection to a brine tank, the gas release position of the valve actuator piston 419 is the same as the brine tank fill position. Directing the air release into the venturi 429 also cleans deposits (e.g., iron deposits) from the venturi 429 and/or gas passage 424. During the gas release cycle, the aeration control valve 400 may also direct untreated water from the supply water inlet passage 421 to the first tank passage 422 and directs treated water from the second tank passage 423 to the service water outlet passage 421. Thus, the gas release may occur while the water treatment system is "in service" and treating water.

Referring to FIG. 5, another embodiment of an aeration control valve 500 is based on a Fleck 1500 or Fleck 2510 control valve available from Pentair, Inc., which was originally configured for connection to a brine tank. In this embodiment, the aeration control valve 500 is configured with the gas passage 524 being used to supply and release gas instead of being connected to a brine tank. A bypass gas release passage 511 is fluidly coupled to the gas passage 524 to allow gas to be released to the gas passage 524 while "in service" and during water flow.

The aeration control valve 500 includes a valve body 510 and a controller 518. The valve body 510 is coupled to a tank 514 and defines a supply water inlet passage 520, a service water outlet passage 521, first and second tank passages 522, 523, the gas passage 524 and a drain passage 525. According to this embodiment, a valve actuator piston 519 moves within the valve body 510 to provide a fluid connection between the passages 520-525. As shown in FIG. 5A, the bypass gas release passage 511 extends from the first tank passage 522 around the piston 519 to the gas passage 524. The gas release passage 511 is seated within an annular space within the valve and does not interfere with operation of the piston 519.

A gas intake inlet 530 is fluidly coupled to the gas passage 524, and a gas release outlet 532 is fluidly coupled between the gas passage 524 and the drain 525. A gas intake check valve 534 is coupled to the gas intake inlet 530. In this embodiment, an external gas valve 528 in the gas release outlet 532 controls the release of gas to the gas passage 524 and a gas check valve is not needed in the gas release outlet 532. The external gas valve 528, in this embodiment, is in the same location where a brine safety valve would be located and is controlled by a cam 529 that rotates to open and close the valve 528. This embodiment of the aeration control valve 500 also includes a gas pump 531 that pumps gas in through the gas intake inlet 530 to the gas passage 524. Alternatively, a venturi (not shown) may be coupled to the gas inlet 530, which draws gas in through the gas inlet 530 to the gas passage 524 when water flows through the venturi.

During a gas release cycle, the gas valve 528 is opened and the valve actuator piston 519 is located at a position that allows gas to be released from the tank 514, through the bypass gas release passage 511, and into the gas passage 524. In this embodiment of the aeration control valve 500, which was originally configured for connection to a brine tank, the gas release position of the valve actuator piston 519 is the same as the brine tank fill position. During the gas release cycle, the aeration control valve 500 may also direct untreated water from the supply water inlet passage 520 to the first tank passage 522 and directs treated water from the second tank passage 523 to the service water outlet passage 521. Thus, the gas release may occur while the water treatment system 500 is "in service" and treating water.

Accordingly, an aeration control valve, consistent with the embodiments herein, may facilitate aeration in a water treatment system by allowing a gas release cycle while the water treatment system is "in service" and while treated water is flowing.

Consistent with one embodiment, aeration control valve system is provided for use with a water treatment tank. The aeration control valve system includes: a supply water inlet passage configured to receive water from a water supply; a service water outlet passage configured to direct water to a service water system; first and second tank passages configured to direct water in to or out of the water treatment tank; a gas passage fluidly coupled to the first tank passage and configured to allow gas to pass to the water treatment tank; a drain outlet passage configured to direct water from the water treatment tank to a drain; a valve cycle actuator configured to provide fluid connections between the passages based on different positions of the valve cycle actuator during different operation cycles; and a bypass gas release passage extending from a point beyond a flow region of water flowing from the supply water inlet passage and configured to allow gas to be released from the water treatment tank to the gas passage or to the drain outlet passage, during a gas release cycle, while bypassing the water flowing from the supply water inlet passage through the first tank passage.

Consistent with another embodiment, a method is provided for operating a water treatment system. The method includes: treating the water in the water treatment system by directing water from a water supply to a water treatment tank, passing the water through a gas charge to aerate the water, passing the aerated water through filter media in the water treatment tank to filter the aerated water, and directing treated water from the water treatment tank to a service water system; and performing a gas release cycle to release gas from the water treatment system while the water treatment system is in service, wherein the gas is released from the water treatment tank through a bypass gas release passage that bypasses a flow of water being supplied to the water treatment tank.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An aeration control valve system for use with a water treatment tank, the aeration control valve system comprising:
   a supply water inlet passage configured to receive water from a water supply;
   a service water outlet passage configured to direct water to a service water system;
   first and second tank passages configured to direct water in to or out of the water treatment tank;
   a gas passage fluidly coupled to the first tank passage and configured to allow gas to pass to the water treatment tank;
   a drain outlet passage configured to direct water from the water treatment tank to a drain;
   a valve cycle actuator configured to provide fluid connections between the passages based on different positions of the valve cycle actuator during different operation cycles; and
   a bypass gas release passage extending from a point beyond a flow region of water flowing from the supply water inlet passage and configured to allow gas to be released from the water treatment tank to the gas passage or to the drain outlet passage, during a gas release cycle, while bypassing the water flowing from the supply water inlet passage through the first tank passage.

2. The aeration control valve system of claim 1 wherein the bypass gas release passage extends from the first tank passage to the valve cycle actuator at a point beyond a flow region of water flowing from the supply water inlet passage.

3. The aeration control valve system of claim 1 further comprising a gas pump coupled to the gas passage for pumping gas through the gas passage.

4. The aeration control valve system of claim 1 further comprising a venturi coupled to the gas passage for drawing gas into the water treatment tank with water flowing through the venturi.

5. The aeration control valve system of claim 1 wherein the valve cycle actuator includes at least a piston configured to block and open the passages selectively at different positions.

6. The aeration control valve system of claim 1 wherein the supply water inlet passage, the service water outlet passage, the tank passages, the gas passage, the drain outlet passage, and the valve cycle actuator are provided in a control valve unit configured to be coupled to the water treatment tank.

7. The aeration control valve system of claim 1 wherein the bypass gas release passage is fluidly coupled to the drain outlet passage, wherein the valve cycle actuator is configured, during a gas release cycle, to provide a fluid connection between the supply water inlet passage and the first tank passage to allow water to be supplied to the water treatment tank, to provide a fluid connection between the second tank passage and the service water outlet passage to allow treated water to flow from the water treatment tank to the service water system, and to provide a fluid connection between the bypass gas release passage and the drain outlet passage to allow gas to release from the water treatment tank to the drain.

8. The aeration control valve system of claim 7 wherein the valve cycle actuator includes at least a piston body configured to block and open the passages selectively at different positions, and wherein the piston includes a notched portion configured to allow the gas to be released from the water treatment tank through the water supply passage to the drain.

9. The aeration control valve system of claim 1 wherein the bypass gas release passage is fluidly coupled to the gas passage.

10. The aeration control valve system of claim 9 further comprising:
    a gas intake inlet fluidly coupled to the gas passage and configured to supply gas to the gas passage;
    a gas release outlet fluidly coupled between the gas passage and the drain outlet passage and configured to release gas to the drain outlet passage;
    a gas valve configured to allow gas to be released from and/or supplied to the water treatment tank; and
    a gas intake check valve configured to allow gas to be supplied through the gas intake passage without allowing gas to be released.

11. The aeration control valve system of claim 10 further comprising a gas pump coupled to the gas intake inlet for pumping gas into the water treatment tank.

12. The aeration control valve system of claim 10 wherein the supply water inlet passage, the service water outlet passage, the tank passages, the gas passage, the drain outlet passage, and the valve cycle actuator are provided in a control valve unit configured to be coupled to the water treatment tank, and wherein the gas valve is an internal valve within the control valve unit.

13. The aeration control valve system of claim 12 further comprising a gas release check valve coupled to the gas release outlet and configured to allow gas to be released through the gas release outlet.

14. The aeration control valve system of claim 10 wherein the gas valve is an external valve coupled to the gas release outlet external to the control valve unit.

15. The aeration control valve system of claim 1 wherein the bypass gas release passage is fluidly coupled to the drain outlet passage.

16. The aeration control valve system of claim 15 wherein the bypass gas release passage is external.

17. The aeration control valve system of claim 1 wherein the bypass gas release passage is external.

* * * * *